United States Patent [19]

Harper et al.

[11] 4,423,165

[45] Dec. 27, 1983

[54] WATER-BORNE COATING COMPOSITION MADE FROM EPOXY RESIN, FIRST POLYMERIC ACID, TERTIARY AMINE AND SECOND POLYMERIC ACID

[75] Inventors: Lee R. Harper, Media; Judith E. Obetz, Bryn Mawr, both of Pa.; William H. Steinmetz, Collingswood, N.J.

[73] Assignee: E. I. Du Pont de Nemours and Company, Wilmington, Del.

[21] Appl. No.: 369,077

[22] Filed: Apr. 16, 1982

[51] Int. Cl.³ .......................... C08K 3/20; C08L 63/00
[52] U.S. Cl. .................................... 523/409; 523/411; 523/412; 524/501
[58] Field of Search ................ 523/412, 414; 524/501; 523/409, 411

[56] References Cited

U.S. PATENT DOCUMENTS

| | | | |
|---|---|---|---|
| 2,784,128 | 3/1957 | Schroder | 523/409 |
| 2,954,358 | 9/1960 | Hurwitz | 523/209 |
| 3,492,252 | 1/1970 | Euchner et al. | 523/412 |
| 4,247,439 | 1/1981 | Matthews et al. | 523/412 |

FOREIGN PATENT DOCUMENTS

| | | | |
|---|---|---|---|
| 6336 | 1/1980 | European Pat. Off. | 523/412 |
| 52-24231 | 2/1977 | Japan | 523/412 |

*Primary Examiner*—Joseph L. Schofer
*Assistant Examiner*—N. Sarofim
*Attorney, Agent, or Firm*—Richard H. Burgess

[57] ABSTRACT

Water-borne reaction products of (a) carboxyl-functional polymers; (b) polyepoxides; and (c) tertiary amines are blended with (d) carboxyl-functional polymers having an acid number dissimilar to that of (a). The resulting products are useful as film-forming components of coating compositions which can be spray-, flow-, dip-, roller-, or electro-coated and are especially useful for spray coating the inside of two-piece tin-plated steel cans of beverages and food. The coating compositions are useful as such or can be crosslinked with crosslinking agents such as a nitrogen resin.

39 Claims, No Drawings

WATER-BORNE COATING COMPOSITION MADE FROM EPOXY RESIN, FIRST POLYMERIC ACID, TERTIARY AMINE AND SECOND POLYMERIC ACID

CROSS-REFERENCE TO RELATED APPLICATIONS

The present invention is an improvement over U.S. Pat. No. 4,247,439—Matthews and Sommerfeld, granted Jan. 27, 1981 and incorporated herein by reference.

BACKGROUND OF THE INVENTION

This invention relates to coating compositions based on a water-borne reaction product of carboxyl-functional polymers, an epoxide, and a tertiary amine, having general utility in coating metallic substrates. It is more particularly directed to coating compositions useful as can coatings.

Coatings of the prior art are often dissolved or dispersed in organic solvents. Among commonly utilized thermosetting compositions are those based on epoxy resins crosslinked with nitrogen resins, usually in an acid catalyzed process.

Aqueous epoxy-acrylic-amine coating compositions of other investigators are less stable than desired or lack advantages of the present invention, especially for applications to steel cans including tin-plated steel cans.

SUMMARY OF THE INVENTION

According to the present invention, there is provided a water-borne coating composition based on polymeric quaternary salts of polymeric acids which are the reaction product of:
(A) 50–90%, based on the weight of (A) plus (B), preferably 65–90%, most preferably about 78%, of an epoxy resin containing, on the average, about 1½ to 2, preferably about 2, terminal 1,2-epoxy groups per molecule and having an epoxy equivalent weight of 750–5000, preferably about 1500–4000, most preferably about 3000;
(B) a carboxyl-functional polymer in an amount sufficient to provide at least 1.25, preferably at least about 1.75, and not more than 6.0, equivalents of carboxyl groups, when the source of the carboxyl group is a mono-protic acid, and at least 2.0 equivalents of carboxyl groups, when the source of such groups is a diprotic acid, per equivalent of 1,2-epoxy groups in the epoxy resin of (A), said polymer having a weight average molecular weight (determined by light scattering) of 10,000–160,000, preferably about 10,000–80,000, most preferably about 13,000–18,000, and an acid number of 100–500, preferably about 150–350, most preferably about 300; and
(C) at least 1.25, preferably at least about 1.75, most preferably about 3.0, equivalents, preferably as an aqueous solution, of a tertiary amine per equivalent of 1,2-epoxy groups in the epoxy resin of (A), said tertiary amine being selected from the group consisting of $R_1R_2R_3N$, pyridine, N-methyl pyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms, preferably dimethyl ethanol amine; and
(D) optionally, 10–90% of the amount required for stoichiometric reaction with the carboxyl-functional polymer of (B) of at least one primary, secondary or tertiary amine or monofunctional quaternary ammonium hydroxide; and
wherein for increasing ratios of carboxyl groups to 1,2-epoxy groups, the amount of amine is increased to keep the carboxyl-functional polymer water dispersible;
(E) said second carboxyl-functional polymer being blended in an amount of 5 to 200 parts by weight per 100 parts by weight of (A) plus (B) and having a weight average molecular weight (determined by light scattering) of about 10,000–160,000 and an acid number of 50–500, said acid number being at least 50 units different than the acid number of said first carboxyl-functional polymer; said second reaction product containing not less than 30% by weight of epoxy resin (A) based on the total of (A), (B) and (E).

Preferably the first carboxyl-functional polymer has an acid number of at least 100 units higher than that of said second carboxyl-functional polymer. The second carboxyl-functional polymer (E) can be neutralized with an amine before it is blended with the first reaction product. Preferably the first reaction product is prepared in organic solvents using an aqueous solution of tertiary amine (C), then the second carboxyl-functional polymer (E) is blended with the first reaction product, and then the combined reaction product is inverted into water by blending with water in sufficient quantity so that the continuous phase is aqueous.

Preferably, components (A), (B), (C) and (E) are capable of forming hydrogel structures with components (A), (B), (C) and (E) comprising about 0.1–50% of the coating composition and the remainder comprising water and, optionally, organic liquid(s) in a volume ratio of from 70:30 to all water, sometimes preferably 80:20.

(Percentages, proportions and ratios herein are by weight except where indicated otherwise.)

The water-borne coating composition can be crosslinked without the addition of a crosslinking agent or, optionally, it can contain crosslinking agents such as a nitrogen resin or a phenolic resin, as well as additives commonly utilized in coating compositions such as pigments, fillers, UV absorbers, and the like.

DESCRIPTION OF THE INVENTION

The preferred water-borne coating composition of the invention is a solution or dispersion of the reaction products of an epoxy resin, a tertiary amine, and two carboxyl-functional polymers. By mixing these components in a defined manner and utilizing aqueous solutions of specific tertiary amines such as dimethyl ethanol amine, a stable, water soluble or dispersible salt of a polymeric quaternary ammonium hydroxide and at least two carboxyl-functional polymers results which can be crosslinked without the additional of external crosslinking agents. The optional addition of external crosslinking agents, such as phenolic or nitrogen resins, also affords a crosslinkable solution or dispersion which is stable at room temperature. Both compositions, the salt and the solution or dispersion containing an external crosslinking agent, are infinitely dilutable with water.

Whether the coating composition is a solution or a dispersion is largely dependent on the nature of the particular amine used, the stoichiometry of the system, and the epoxy equivalent weight. Even when the composition is opaque some of the resinous components may be dissolved, and when the composition appears to be a clear solution it is possible that small amounts of the components are in a dispersed state. For sake of simplicity, hereafter the term "dispersion" will be used to denote the water-borne coating composition.

The dispersion, with or without an external crosslinking agent, as prepared, usually has a pH of about 7-8 and a nonvolatile content of up to 50%. Upon drying, a hard, solvent-resistant film having excellent resistance to acids, bases, hot water, and detergent results.

PREPARATION OF FIRST REACTION PRODUCT

The low molecular weight epoxy resins to be utilized in the present invention are commonly known in the art. One class of such resins has the generalized formula

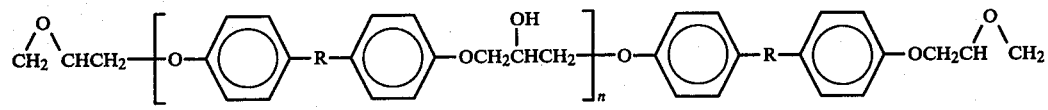

wherein R is an alkylene group of 1–4 carbon atoms and n is an integer from 1–12. The epoxy resins utilized in this invention contain an average of at least about one and a half and up to two terminal 1,2-epoxy groups per molecule and are in the epoxy equivalent weight range of 750–5000, preferably 1500–4000. They can also contain substituted aromatic rings.

One such preferred epoxy resin is "Epon 1004" where R is isopropylidene, the average value of n is 5, having an epoxy equivalent weight of 875–1025, with an average of about 950±50. The epoxy equivalent weight is defined as the grams of resin containing 1 gram-equivalent of epoxide as measured by ASTM-D-1652. The coating composition containing "Epon 1004" affords a glossy, flexible, chemically-resistant film. Another preferred epoxy resin is "Epon 1007" where R is isopropylidene, the average value of n is 11, having an epoxy equivalent weight of 2000–2500, with an average of about 2175±50. The coating composition containing "Epon 1007" affords glossy, tough, flexible films upon cure. Another preferred epoxy is an analog of "Epon 1009" with an average epoxy equivalent weight of 3000 made by chain extending "Epon 829" (EW 195) with bisphenol A. The Epon products are made by Shell Chemical Company.

The quantity of the epoxy resin to be utilized in the coating composition of this invention is determined in relation to the amount of carboxyl-functional polymer and the relative amounts are dependent on the end used application of the coating but there must be at least 50%, preferably in the range of 65–90%, of epoxy resin present. There must be, furthermore, at least 1.25, preferably at least 1.75, and most preferably about 4.6, equivalents of carboxyl groups per equivalent of 1,2-epoxy groups in the epoxy resin. This minimum equivalent requirement is valid for those carboxyl-functional polymers which contain monoprotic acids derived from alpha,beta-ethylenically unsaturated acid monomers such as acrylic acid, methacrylic acid, monoesters of alkanols having 1–8 carbon atoms with diacids, such as maleic acid, itaconic acid, fumaric acid, mesaconic acid, citraconic acid and the like, and mixtures thereof. For those carboxyl-functional polymers which contain diprotic acids derived from diacids such as maleic acid, itaconic acid, fumaric acid, mesaconic acid, citraconic acid, and mixtures thereof, the minimum requirement is 2.0 equivalents, preferably at least 2.5 equivalents, of carboxyl group per 1,2-epoxy groups. Usually, no more than 10.0, and preferably no more than 6.0, equivalents of carboxyl groups, per equivalent of 1,2-epoxy groups will be present.

The carboxyl-functional polymers utilized in this invention are prepared by conventional free radical polymerization techniques from at least one ethylenically unsaturated monomer and at least one ethylenically unsaturated acid monomer. The choice of the alpha,beta-unsaturated monomer(s) is dictated by the intended end use of the coating composition and is practically unlimited. A variety of acid monomers can be used; their selection is dependent on the desired final polymer properties.

This acid monomer can be an ethylenically unsaturated acid, mono-protic or diprotic, anhydride or monoester of a dibasic acid, which is copolymerizable with the other monomer(s) used to prepare the polymer.

Illustrative monobasic acids are those represented by the structure

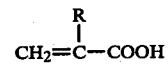

where R is hydrogen or an alkyl radical of 1-6 carbon atoms.

Suitable dibasic acids are those represented by the formula

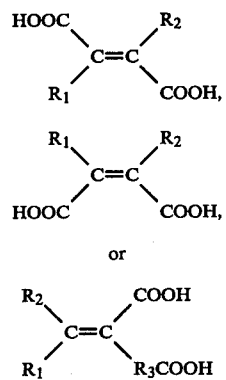

where $R_1$ and $R_2$ are hydrogen, an alkyl radical of 1–8 carbon atoms, halogen, cycloalkyl of 3–7 carbon atoms or phenyl, and $R_3$ is an alkylene radical of 1–6 carbon atoms. Half-esters of these acids with alkanols of 1–8 carbon atoms are also suitable.

The most preferred acid monomers are acrylic acid, methacrylic acid, and itaconic acid.

The acid number of the polymers is 100–500, which corresponds to concentrations of about 10–77% of the acid monomers by weight of the polymer. The acid number is the number of milligrams of potassium hydroxide required to neutralize one gram of the polymer. For purposes of illustration, an acid number of 100 corresponds to the presence in the polymer of either 12.8% acrylic acid, 15.3% of methacrylic acid, 11.5% of itaconic acid, or 10.3% of maleic or fumaric acid. An acid number of 500 corresponds to 64% of acrylic acid, 76.5% of methacrylic acid, 57.5% of itaconic acid, or 51.5% of maleic or fumaric acid in the polymer. Preferred acid number values are 150–350.

Vinyl aromatic monomers are commonly utilized to be copolymerized with the acid monomers. They are represented by the structure:

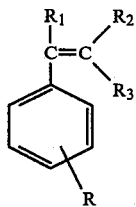

where R, $R_1$, $R_2$, and $R_3$ are hydrogen or an alkyl radical of 1–5 carbon atoms. Illustrative of these monomers are styrene, α-methyl styrene, vinyl toluene, and the like. The best polymers, in terms of final film properties, are those in which this type of monomer is styrene. The vinyl aromatic monomers can be present from 0–80% of the carboxyl-functional polymer, preferably from 40–80%, most preferably from 40–70%, and specifically at concentrations of about 42, 53, and 66%. For some purposes 10–45% may be preferred and, in some applications, the polymer contains no such monomer.

Other commonly utilized monomers are the α,β-unsaturated nitriles represented by the structure:

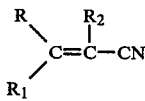

where R and $R_1$ are hydrogen, an alkyl radical of 1–18 carbon atoms, tolyl, benzyl or phenyl, and $R_2$ is hydrogen or methyl. Most commonly utilized are acrylonitrile and methacrylonitrile. The nitrile monomer can be present from 0–40% based on the carboxyl-functional polymer. The polymers preferably contain 10–30% and more preferably 18–22% of the polymer, of the nitrile monomer. For certain purposes it may be desirable to use 5–10% of the nitrile monomer and in some cases no such monomer is included in the polymers.

Other suitable monomers are esters of acrylic acid, methacrylic acid or mixtures thereof with $C_1$–$C_{16}$ alkanols. Preferred esters are the methyl, ethyl, propyl, n-butyl isobutyl, and 2-ethylhexyl esters of acrylic acid or methacrylic acid or mixtures of such esters. These esters can be present in concentrations of 0–97.

One can also utilize hydroxyalkyl (meth)acrylate monomers such as hydroxyethyl acrylate, hydroxypropyl acrylate, hydroxyethyl methacrylate, hydroxypropyl methacrylate or mixtures thereof. Up to 20% of such ester(s) can be incorporated.

It may be desirable, for certain uses, to include in the polymer acrylamide, methacrylamide or an N-alkoxymethyl (meth)acrylamide such as N-isobutoxymethyl (meth)acrylamide. Alternatively, a polymer containing copolymerized acrylamide or methacrylamide can be post-reacted with formaldehyde and an alkanol to produce an N-alkoxymethylated polymer.

The carboxyl-functional polymers can be prepared by polymerizing suitable monomers, in proper amounts, in an organic liquid medium. In general, this liquid is an organic liquid capable of medium hydrogen bonding, or a combination of this liquid with less than about 50% of an organic liquid capable of strong hydrogen bonding.

Preferably, the liquid medium for the polymerization is an alcohol mixture, generally 62% butanol and 38% of ethylene glycol monobutyl ether. Other media which could be used include either water-soluble or insoluble ketone. Optionally, the ketone can also contain less than about 50% of an ethylene glycol- or diethylene glycol monoalkyl ether (where the alkyl group contains 1–4 carbon atoms), or diacetone alcohol, and/or an alkanol of 1–4 carbon atoms or an alkanediol of 1–7 carbon atoms. A preferred medium is methyl ethyl ketone used by itself. Another preferred medium for the polymerization is a mixture of methyl ethyl ketone and ethylene glycol monobutyl ether.

A catalyst or polymerization initiator is ordinarily used in the polymerization of the carboxyl-functional polymers, in the usual amounts. This can be any free radical initiator that decomposes with a half-life of 0.5 to 2.5 hours at the reflux temperature of the organic liquid medium being used. Tertiary butyl perbenzoate, tertiary butyl peroxypivalate, and tertiary butyl peroxyisobutyrate are preferred.

The polymers utilized in the water-borne coating composition of this invention have a weight average molecular weight, as determined by light scattering or, more conveniently, gel permeation chromatography, using a polystyrene standard, calibrated by light scattering methods of about 10,000–160,000. The preferred weight average molecular weight range is 10,000–80,000. For some applications a 13,000–18,000 molecular weight is preferred.

During the preparation of the coating composition of this invention, an aqueous solution of a tertiary amine, specified below, is brought in contact with a solution of an epoxy resin in organic liquid(s) or with a solution of an epoxy resin and a carboxyl-functional polymer. A wide variety of organic liquids can be used to dissolve the epoxy resins and the carboxyl-functional polymers. Among the most commonly used solvents are alcohols such as isopropanol, the butyl alcohols, 2-hydroxy-4-methyl-pentane, 2-ethylhexyl alcohol, cyclohexanol, glycols such as ethylene glycol, diethylene glycol, 1,3-butylene glycol, ether alcohols such as ethylene glycol mono-ethyl ether, ethylene glycol mono-butyl ether, diethylene glycol mono-methyl ether, mixtures thereof, and many aliphatic and aromatic hydrocarbons if used admixed with at least one of the above.

While the exact mode of the reaction is not fully understood, it is believed that the tertiary amine first reacts with the carboxyl-functional polymer to form the corresponding salt which, in turn, can dissociate to allow the amine to react with the 1,2-epoxy groups of the epoxy resin. It is also possible, however, that the tertiary amine reacts directly with the 1,2-epoxy groups. In either case, the resulting quaternary ammonium hydroxide can react with the carboxyl-functional polymer to yield a polymeric quaternary ammonium-amine mixed salt of a polymeric acid.

The reaction of tertiary amines with materials containing epoxy groups, to yield adducts containing quaternary ammonium groups, is known. Such reaction, when carried out in presence of water or other suitable proton donors, such as certain alcohols or carboxylic acids, can afford a product that contains both a hydroxyl group and a quaternary ammonium hydroxide. The reaction can be represented schematically as follows:

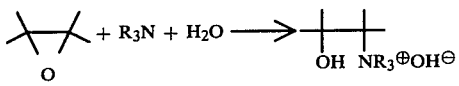

While most tertiary amines react with epoxy resins to form quaternary ammonium hydroxides, the preparation of the water-borne coating composition of this invention is carried out utilizing at least one tertiary amine selected from the group: $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms. Some examples of $R_1R_2R_3N$ are: trimethyl amine, dimethyl ethanol amine (also known as dimethyl amino ethanol), methyl diethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, and mixtures thereof. Most preferably trimethyl amine or dimethyl ethanol amine is used.

The generation of a polymeric quaternary ammonium hydroxide which is water soluble or dispersible when in presence of a nitrogen resin crosslinking agent is described in U.S. Pat. No. 4,076,676, granted Feb. 28, 1978, and its relevant portions are hereby incorporated by reference.

The amount of tertiary amine needed in the preparation of the water-borne coating composition of this invention is determined by two factors. As a minimum, there is required at least 1.25 equivalents of tertiary amine per equivalent of 1,2-epoxy groups, preferably at least 1.75 equivalents, more preferably 3.0, for the formation of stable dispersions. As the ratio of the number of carboxyl groups in the carboxyl-functional polymer to the number of 1,2-epoxy groups in the epoxy resin increases, the amount of amine is also increased to keep the carboxyl-functional polymer water dispersible. This excess amine is believed to form a salt with some or all of the excess carboxyl groups of the polymer. It is preferred that no excess amine, over the total number of equivalents of carboxyl groups, be used in the coating composition of this invention. The amine utilized in excess of the 1.25 equivalents of the highly specific tertiary amine per equivalent of 1,2-epoxy groups need not be the same as, nor does it necessarily have to be selected from the group of, the highly specific tertiary amines. Any primary, secondary or tertiary amine or monofunctional quaternary ammonium hydroxide can be utilized in neutralizing carboxyl groups of the carboxyl-functional polymer which are not already neutralized. Among such tertiary amines are included: triethyl amine, diethyl ethanol amine, dimethyl cyclohexyl amine, triethanol amine, tributyl amine, dimethyl n-butyl amine, tripropyl amine, dimethyl lauryl amine, and γ-picoline. Primary and secondary amines preferably should not be used alone with tertiary amines in the neutralization of the epoxies because unwanted covalent bonds could be formed, and this can interfere with the desired hydrogel formation.

The first reaction product can be prepared without regard to the sequence of addition of the various components. It is preferred, however, to first dissolve the epoxy resin in suitable organic liquids and then add the carboxyl-functional polymer which has been partially neutralized with a suitable tertiary amine, usually dissolved in water. Additional water can then be added to achieve the final volume ratio of water and organic liquid of from 70:30 preferably to 90:10. Additional amine can also be added to insure dispersibility.

A preferred ratio of tertiary amine to water is approximately 1:3 by weight.

The reaction can be carried out between room temperature and below the boiling point of the reaction medium, preferably between 50°–100° C., most preferably 90°–100° C. In this temperature range there is a rapid rate of reaction.

In another preferred method of preparation of the coating composition, an epoxy resin is dissolved in a suitable organic liquid such as the mono-butyl ether of ethylene glycol or diethylene glycol, followed by the addition of a suitable tertiary amine. After the formation of the polymeric quaternary ammonium hydroxide is substantially complete, a carboxyl-functional polymer, dissolved in a suitable organic liquid is mixed with it with agitation. This latter solution can also contain any additional primary, secondary or tertiary amine, dissolved in water, necessary for dispersibility of the coating composition. Mixing with any additional desired water of the components completes the preparation of the water-borne coating composition. This sequence of steps can also be carried out between room temperature and temperatures below the boiling point of the reaction media.

Alternatively, the first reaction product of this invention can be prepared by first dissolving the epoxy resin in the carboxyl-functional polymer, in the presence of suitable organic liquids. Addition of a suitable tertiary amine, usually dissolved in water, completes the preparation of the polymeric quaternary ammonium salt of a polymeric acid. Additional water can then be added to achieve the final volume ratio of water and organic liquid of from 70:30 preferably to 90:10. Additional amine can also be added to insure dispersibility.

The polymeric quaternary ammonium-amine mixed salt of the carboxyl-functional polymer of the water-borne coating composition of this invention preferably is a complex hydrogel structure. It is the generation, during the epoxy/carboxyl/amine reaction, of such a hydrogel structure which affords the solubility or dispersibility, and stabilization, in water of the coating composition. A possible schematic formula is shown by the formula below. The exact nature of the bonding is not known. The number of carboxyl groups in the schematically shown polymer molecules and of the relative portion of free acid groups to the amine salt groups are determined by the stoichiometry employed during the preparation of the coating composition. The schematic representation is shown to further the understanding of the nature of the invention:

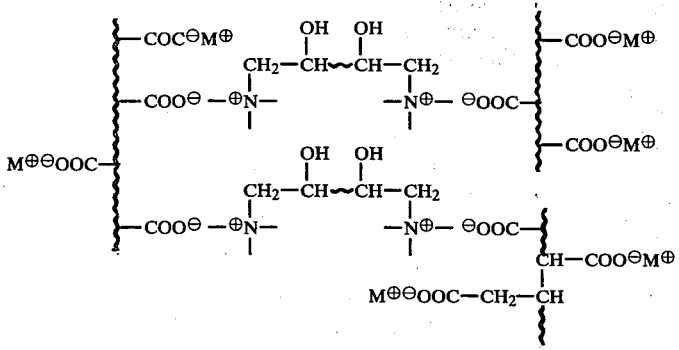

where M⊕ is hydrogen or a protonated primary, secondary or tertiary amine or a monofunctional quaternary ammonium group and

is formed from a tertiary amine selected from the group: $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1-4 carbon atoms.

ADDITION OF SECOND CARBOXYL-FUNCTIONAL POLYMER

It has been found that desirable versatile rheological characteristics can be obtained in compositions of the invention if the second polymeric-acid-containing polymer (typically an acrylic) is added after the first reaction product is formed, typically of epoxy and acrylic resins and tertiary amines. Although the invention can be useful if the second acrylic is added after inversion, better dispersion stability is generally obtained if the second acrylic polymer is added before the first reaction product has been inverted into or diluted with water to a substantial extent, such as up to the full water content that will be in the finished product.

The first and second acrylics should have significantly dissimilar acid numbers, as defined. For reasons not clearly understood, this gives better results than if the composition is made with a single acrylic resin having an acid number which is the average of the two acrylics used, or if both acrylic resins are present for the initial epoxy amine reactions.

One hypothesis for the unusual rheological behavior observed is that the ionic bonds between the in-situ formed quaternary structure and the carboxyl groups on the acrylic resin present initially are not completely labile and do not arrive at an equilibrium or statistical distribution of ionic charges with the carboxyl groups on the acrylic resin added in the second stage. Another hypothesis along the same lines relates to the formation of hydrogel structures formed by ionic bonding of quaternary structures and carboxyls from the acrylic resin present initially. This hydrogel structure may effectively remove some species from a continuous phase, again restricting equilibrium distribution of ionic charges.

APPLICATION TECHNIQUES

The water-borne coating composition of this invention is a stable solution or dispersion and can be used as prepared. It can be crosslinked without the addition of an external crosslinking agent and can also be crosslinked with external crosslinking agents such as phenol formaldehyde resins or, preferably, nitrogen resins.

The nitrogen resins are well known. They are the alkylated products of amino-resins prepared by the condensations of at least one aldehyde with at least one of urea, N,N'-ethyleneurea, dicyandiamide, and aminotriazines such as melamines and guanamines. Among the aldehydes that are suitable are formaldehyde, revertible polymers thereof such as paraformaldehyde, acetaldehyde, crotonaldehyde, and acrolein. Preferred are formaldehyde and revertible polymers thereof. The amino-resins are alkylated with at least one and up to and including six alkanol molecules containing 1-6 carbon atoms. The alkanols can be straight chain, branched or cyclic.

Among the preferred nitrogen resins are partially methylated melamines, partially butylated melamines, hexaethoxymethylmelamine, hexamethoxymethylmelamine, dimethoxytetraethoxymethylmelamine, dibutyoxytetramethoxymethylmelamine, butylated benzoguanamine, partially methylated urea, fully methylated urea, fully butylated urea, hexabutoxymethylmelamine, and mixtures thereof.

These nitrogen resins can be blended directly into the coating compositions at the completion of the preparation or before final dilution with water, either as a solid or as a solution in some miscible organic liquid.

The nitrogen resins are ordinarily added to the composition of the invention at concentrations ranging from 5 to 15%. The exact amount will be dictated primarily by the final properties desired of the composition and can be determined by one skilled in this art.

In the claims, the term "consisting essentially of" means not including other ingredients in amounts which change the basic and novel characteristics of the invention, including providing an aqueous acid-polymer-modified epoxy coating composition that can form a hydrogel and is useful as an interior coating for cans. Other commonly utilized additives such as coalescing aids, flow-control agents, pigments and the like can be added, in the usual amounts, if this appears necessary or desirable.

The water-borne composition can be applied by a variety of techniques and to a variety of substrates known in industry. For example, the coating composition of this invention can be utilized in the can manufacturing industry which utilizes mainly metallic cans, many of them cylindrical, made from aluminum, tin-free steel, electrolytic tin-plate, and quality-as-rolled steel, among others. Cans utilized for packaging and shipping food and beer or other beverages are mostly of the three-piece or the two-piece drawn-and-ironed (D and I) variety. Cans constructed from three pieces (body, top and bottom) can be roller coated before the metallic sheet is formed into the body of the can or can be spray coated after partial fabrication. The D and I cans, where the metal sheet is stamped to form a cylindrical body closed at one end, are generally spray coated.

The coating composition of this invention can also be applied by electrodeposition, preferably by techniques described in the above-mentioned U.S. Pat. No. 4,247,439 and in U.S. Pat. No. 4,303,488—Seiler and Sommerfeld, granted Dec. 1, 1981, incorporated herein by reference.

The concentration of the coating composition depends upon the process parameters to be used and is not generally critical. Ordinarily the film-forming components comprise 0.1–50% and preferably 5–30%, for conventional coating methods, and 1–20%, for electrodeposition, of the total composition, the remainder being water and organic liquid(s). The latter are present in a volume ratio of from 90:10 preferably to 70:30.

The freshly deposited films are capable of being immediately dried and/or crosslinked, without regard to the method of coating used to obtain them.

The coating compositions of this invention can be dried to useful films as is or can be cured thermally as is or when containing, for example, a nitrogen resin crosslinking agent. After the composition has been applied to the substrate, baking at elevated temperatures brings about the desired crosslinking. Temperatures of 150° C. to 260° C., for 0.1 to 30 minutes, are typical baking schedules utilized.

The water-borne coating composition of this invention is useful in a variety of applications. This coating composition finds particular utility in the can industry where the composition can be applied to the interior of two-piece drawn-and-ironed and three-piece beer and beverage cans, to the exterior of three-piece beer and beverage cans, to the interior and/or exterior ends of two- or three-piece cans or two- or three-piece sanitary cans. When the coating composition of this invention is applied to the interior of food and beer or beverage cans by spray-coating, a thin uniform film is deposited which, after curing, corresponds to a coating weight of 0.3 to 1.3 milligrams per square centimeter (2–8 milligrams per square inch). Coatings utilized as an interior enamel have excellent taste and odor characteristics, that is to say, low extractables and sorption to prevent taste adulteration.

The water-borne composition also has utility, especially when crosslinked with a nitrogen resin, in automotive primer, appliance finish, and coil coating applications, the final coated articles having especially desirable hardness and acid, base, solvent, and detergent resistance properties. The cured coatings are also resistant to salt spray and "processing". This latter property is tested in a steam-pressure cooker at approximately 120° C.

The following examples gave compositions with adequate stability defined as no significant change in viscosity, solution/dispersion appearance (settling, creaming, syneresis) or film properties of cured coatings after the liquid has been stored for four weeks at 49° C. or six months at room temperature.

They also had acceptable taste performance, meaning they showed no addition to, or substraction of, flavor bodies of contents packed in a can lined with this material after intervals of storage ranging from four weeks to a year.

Although most of the emphasis in this application has been on can coatings, such compositions can also be used as coatings in a variety of other applications.

The invention is further illustrated by the following examples.

PRELIMINARY EXAMPLE A

Acrylic Resin X

Into a suitably equipped kettle, inerted with nitrogen, are added the following, expressed in parts by weight:

| | |
|---|---|
| Monobutyl ether of ethylene glycol | 91.567 |
| Normal butanol | 32.503 |
| Ethyl acrylate | 14.453 |
| Tertiary butyl perbenzoate | 0.026 |

In a separate vessel, the following are added and mixed:

| | |
|---|---|
| Ethyl acrylate | 54.764 |
| Methacrylic acid | 122.060 |
| Styrene | 72.919 |
| Normal butanol | 2.050 |
| Tertiary butyl perbenzoate | 2.351 |

The reactor is heated to reflux and the monomer mixture is added evenly to the refluxing reactor over a two-hour period. Then 7.932 parts of monobutyl ether of ethylene glycol are added as a rinse for the monomer feed lines. Reflux is maintained for one hour, at which point 55.500 parts of normal butanol is added. Reflux temperatures are maintained for one hour, at which point the heat is turned off and 72.623 parts of normal butanol are added, followed by 82.312 parts of dimethyl ethanol amine and 246.940 parts of deionized water. The product is a solution of a styrene/ethyl acrylate/-methacrylic acid//27.6/26.2/46.2 polymer at 30.8% solids in solvent, water and amine. The acid number of the product is 300 before neutralization.

PRELIMINARY EXAMPLE B

Acrylic Resin Y

Into a suitably equipped kettle, inerted with nitrogen, are added the following, in parts by weight:

| | |
|---|---|
| Monobutyl ether of ethylene glycol | 1828.36 |
| Normal butanol | 649.17 |
| Ethyl acrylate | 466.06 |
| Tertiary butyl perbenzoate | 0.60 |

In a separate vessel, the following are added and mixed:

| | |
|---|---|
| Ethyl acrylate | 1765.61 |
| Methacrylic acid | 807.24 |
| Styrene | 2236.50 |
| Normal butanol | 41.03 |
| Tertiary butyl perbenzoate | 47.06 |

The reactor is heated to reflux and the monomer mixture is added evenly to the refluxing reactor over a two-hour period. Then 158.37 parts of normal butanol are added as a rinse for the monomer feed lines. Reflux is continued for two additional hours at which time the heat is turned off and the batch cooled. The product is a solution of a styrene/ethyl acrylate/methacrylic acid=42.4/42.3/15.3 polymer at 66% solids in solvent. The acid number of the polymer is 100.

PRELIMINARY EXAMPLE C

Acrylic Resin Z

Into a suitably equipped kettle, inerted with nitrogen, are added the following parts by weight:

| Monobutyl ether of ethylene glycol | 1828.00 |
|---|---|
| Normal butanol | 649.60 |
| Ethyl acrylate | 465.33 |
| Tertiary butyl perbenzoate | 0.60 |

In a separate vessel, the following are added and mixed:

| Ethyl acrylate | 1561.15 |
|---|---|
| Methacrylic acid | 1213.79 |
| Styrene | 2037.05 |
| Normal butanol | 41.07 |
| Tertiary butyl perbenzoate | 47.20 |

The reactor is heated to reflux and the monomer mixture is added evenly to the refluxing reactor over a two-hour period. Then 156.28 parts of normal butanol are added as a rinse for the monomer feed lines. Reflux is continued for two additional hours at which time the heat is turned off and the batch cooled. The product is a solution of a styrene/ethyl acrylate/methacrylic acid=38.6/38.4/23.0 polymer at 66% solids in solvent. The acid number of the polymer is 150.

EXAMPLE 1

To a suitable reactor, the following parts by weight are charged:

| Epon 829 (product of Shell Chemical Co.) | 873.9 |
|---|---|
| Bisphenol A | 464.3 |
| Monobutyl ether of ethylene glycol | 84.0 |

The charge is heated to 130°–140° C. and allowed to exotherm to about 200° C. Temperature is maintained above 165° C. for two hours after peak exotherm is reached. The Epon 829 has an epoxy equivalent weight of about 195, and it is chain extended by the bisphenol A to an epoxy equivalent weight of about 3000. 66.6 additional parts of monobutyl ether of ethylene glycol and 273.7 parts of normal butanol are added and the batch is cooled to 100° C. 1211.3 parts of acrylic resin X is added and the batch is heated to reflux and held for 25 minutes. 370.3 parts of acrylic resin Y is added and mixed for 10 minutes. 232.9 parts of normal butanol is added next. 6203 parts of deionized water are added evenly over a one-hour period. The resulting product contains 77.8% epoxy resin and 22.2% acrylic resin in the first stage. Then 14.5 parts of acrylic resin Y are added to 100 parts of the above acrylic/epoxy reaction product (not counting the weight contribution of the amine because it is fugitive on curing), and the overall ratio is 68% epoxy and 32% acrylic. The product is ready to spray at 20.15% solids and has an ICI viscosity of 26 centipoises and a low shear viscosity of 28 sec in a Ford number 4 cup. It is very responsive to pH adjustment and addition of 0.1% dimethyl ethanol amine will increase the ICI viscosity to 32 centipoises and the Ford #4 viscosity to 68". When applied by airless spray to drawn and ironed cans of steel, or of treated or untreated aluminum, the product has very good coverage, very good adhesion, and good blister resistance.

EXAMPLE 2

To a suitable reactor, the following parts by weight are charged:

| Epon 829 | 25.04 |
|---|---|
| Bisphenol A | 12.06 |
| Normal butanol | 1.77 |

The charge is heated to 130°–140° C. and allowed to exotherm to about 200° C. Temperature is maintained above 165° C. for two hours after exotherm is reached. The Epon 829 has an epoxy equivalent weight of about 195, and it is chain extended by the bisphenol A to an epoxy equivalent weight of about 2000. 5.99 parts of normal butanol are added and the batch is cooled to 100° C. 29.06 parts of acrylic resin X are added and the batch is heated to reflux and held for 25 minutes. 40.71 parts of acrylic resin Y are added and mixed for 10 minutes. 11.1 parts of normal butanol are added. 234.52 parts of deionized water are added evenly over a one-hour period. The resulting product contains 80% epoxy resin and 20% acrylic resin in the first stage. Then 59.5 parts of acrylic resin Y are added to 100 parts of the above acrylic/epoxy reaction product, and the overall ratio is 50% epoxy resin and 50% acrylic resin. The product is ready to spray at 20.22% solids and has an ICI viscosity of 25 centipoises and a low shear viscosity of 17 sec in a Ford member 4 cup. It is very responsive to pH adjustment and addition of 0.1% dimethylethanol amine will increase the ICI viscosity to 46 centipoises and the Ford number 4 cup viscosity to 90 sec. When applied by airless spray to drawn and ironed cans of steel or of treated or untreated aluminum, the product has very good coverage, very good blister resistance and excellent adhesion.

EXAMPLE 3

To a suitable reactor, the following parts by weight are charged:

| Epon 1009 | 744.0 |
|---|---|
| Normal butanol | 177.4 |

The charge is heated to about 115° C. and mixed until the epoxy resin is dissolved. Epon 1009 has an average epoxy equivalent weight of 3250. The batch is cooled to 100° C. and 604.0 parts of acrylic resin X are added and the batch is heated to reflux and held for 25 min. 408.9 parts of acrylic resin Y are added and mixed until uniform. 232.2 parts of normal butanol are added. 2065.8 parts of deionized water are added uniformly over a one-hr period. An additional 1767.9 parts of deionized water are added. The resulting product contains 80% epoxy resin and 20% acrylic resin from the first stage. Then 29 parts of acrylic resin Y are added to 100 parts of the above acrylic/epoxy reaction product, and the overall ratio is 62% epoxy resin and 38% acrylic resin.

The product is ready to spray at 20% solids and has an ICI viscosity of 19 centipoises and a low shear viscosity of 16 sec in a Ford number 4 cup. It is responsive to pH adjustment and addition of 0.1% dimethylethanol amine increases the ICI viscosity to 26 centipoises and the Ford number 4 cup viscosity to 23 sec. When applied by airless spray to drawn and ironed cans of steel or of treated or untreated aluminum, the product has very good coverage, good blister resistance and excellent adhesion.

EXAMPLE 4

To a suitable reactor, the following parts by weight are charged:

| Epon 1007 | 672.0 |
|---|---|
| Normal butanol | 160.3 |

The charge is heated to about 115° C. and mixed until the epoxy resin is dissolved. Epon 1007 has an average epoxy equivalent weight of about 2000. The batch is cooled to 100° C. and 545.1 parts of acrylic resin X are added and the batch is heated to reflux and held for 25 minutes. 545.5 parts of acrylic resin Z are added and mixed until uniform. 232.2 parts of normal butanol are added. 2077.2 parts of deionized water are added uniformly over a one-hour period. An additional 1767.9 parts of deionized water are added. The resulting product contains 80% epoxy resin and 20% acrylic resin from the first stage. Then 42.8 parts of acrylic resin Z are added to 100 parts of the above acrylic/epoxy reaction product, and the overall ratio is 56% epoxy resin and 44% acrylic resin. The product is ready to spray at 20% solids.

The product has an ICI viscosity of 27 centipoises and a low shear viscosity of 16 sec in a Ford number 4 cup. It is very responsive to the pH adjustment, and the addition of 0.1% dimethyl ethanol amine will increase the ICI viscosity to 34 centipoises and the Ford number 4 viscosity to 27 sec. When applied by airless spray to drawn and ironed cans of steel, treated or untreated aluminum, the product has very good coverage, excellent adhesion and good blister resistance.

EXAMPLE 5

3800 parts of Example 2
76 parts of Cymel 373 (product of American Cyanamid Co.)

Mix well. This acts as an external crosslinker to aid in curing coated films. Cymel 373 is a partially alkylated melamine formaldehyde resin which is 85% solids in water.

EXAMPLE 6

3800 parts of Example 2
38 parts of Cymel 373
38 parts of Methylon resin 75108

Mix well. These additives are both external crosslinkers to aid in curing coated films. Methylon resin 75108 is a coating intermediate consisting of a mixture of the allyl ethers of mono-, di- and tri-methylol phenols, produced by General Electric Company.

EXAMPLE 7

To a suitable reactor, the following parts by weight are charged:

| Epon 829 | 358.9 |
|---|---|
| Bisphenol A | 190.7 |
| Monobutyl ether of ethylene glycol | 34.5 |

The charge is heated to 130°–140° C. and allowed to exotherm to about 200° C. Temperature is maintained above 165° C. for two hours after peak exotherm is reached. Epon 829 has an epoxy equivalent weight of about 195, and it is chain extended by bisphenol A to an epoxy equivalent weight of about 3000. 27.4 parts of monobutyl ether of ethylene glycol and 112.4 parts of normal butanol are added, and the batch is cooled to 100° C. 497.5 parts of acrylic resin X is added and the batch is heated to reflux and held for 25 minutes. 2183 parts of deionized water are added over a one-hour period and then 95.7 parts of normal butanol are added. 104.3 parts of deionized water are added. A premix is made of 124.9 parts of acrylic resin Y, 20.5 parts of deionized water and 1.6 parts of dimethyl ethanol amine. This premix is added to the above dispersion. This gives a final dispersion where the solids portion is 60% epoxy and 40% acrylic resin. The product is ready to spray at 21% solids, and has an ICI viscosity of 36 centipoises and a low shear viscosity in a Ford number 4 of 38 sec. When applied by airless spray to drawn and ironed cans of steel, treated or untreated aluminum, the product has good coverage, good blister resistance and very good adhesion. This particular sample has acceptable stability after 4 weeks at 50° C., although the stability varies and other similar samples have been less stable and not always acceptable.

We claim:

1. A water-borne coating composition consisting essentially of liquid carrier and a second reaction product made by blending a second carboxyl-functional polymer with a first reaction product, wherein said first reaction product is the product of the reaction in an organic media of:
   (A) 50–90% by weight, based on the weight of (A) plus (B), of an epoxy resin containing, on the average, about 1½ to 2 terminal 1,2-epoxy groups per molecule and having an epoxy equivalent weight of 750–5000;
   (B) a first carboxyl-functional polymer in an amount sufficient to provide at least 1.25 equivalents of carboxyl groups, when the source of the carboxyl group is a mono-protic acid, and at least 2.0 equivalents of carboxyl groups, when the source of such groups is a diprotic acid, per equivalent of 1,2-epoxy groups in the epoxy resin, said polymer having a weight average molecular weight (determined by light scattering) of about 10000–160000 and an acid number of 100–500;
   (C) at least 1.25 equivalents of a tertiary amine per equivalent of 1,2-epoxy groups in the epoxy resin, said tertiary amine being selected from the group consisting of $R_1R_2R_3N$, pyridine, N-methylpyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms;
   (D) optionally, 10–90% of the amount required for stoichiometric reaction with the carboxyl-functional polymer of (B) of at least one primary, secondary or tertiary amine or monofunctional quaternary ammonium hydroxide;
wherein for increasing ratios of carboxyl groups to 1,2-epoxy groups, the amount of amine is increased to keep the carboxyl-functional polymer water dispersible;
(E) said second carboxyl-functional polymer being blended in an amount of 5 to 200 parts by weight per 100 parts by weight of (A) plus (B) and having a weight average molecular weight (determined by light scattering) of about 10,000–160,000 and an acid number of 50–500, said acid number being at least 50 units different than the acid number of said first carboxyl-functional polymer, said second reaction product containing not less than 30% by weight of epoxy resin (A) based on the total of (A), (B) and (E).

2. The composition of claim 1 wherein water is blended with the first reaction product in sufficient quantity in that the continuous phase is aqueous, and then (E) is blended with the first reaction product.

3. The composition of claim 1 wherein (E) is blended with the first reaction product to make the second reaction product and then water is blended with the second reaction product in sufficient quantity so that the continuous phase is aqueous.

4. The composition of claim 2 wherein the second carboxyl-functional polymer (E) is neutralized with an amine before (E) is blended with the first reaction product.

5. The composition of claim 3 wherein the second carboxyl-functional-polymer (E) is neutralized with an amine before (E) is blended with the first reaction product.

6. The composition of claim 1 wherein tertiary amine (C) is provided as an aqueous solution.

7. The composition of claim 1 wherein said first carboxyl-functional polymer has an acid number at least 100 units higher than that of said second carboxyl-functional polymer.

8. The composition of claim 1 wherein components (A), (B), (C), (D) and (E) comprise about 0.1–50% by weight of the coating composition and the remainder is comprised of the liquid carrier which is water and, optionally, organic liquid in a volume ratio of from 70:30 to all water.

9. The composition of claim 1 wherein said first carboxyl-functional polymer is present in an amount sufficient to provide at least 1.75 equivalents of carboxyl groups, when the source of the carboxyl groups is a mono-protic acid, and at least 2.5 equivalents of carboxyl groups, when the source of such groups is a di-protic acid, per equivalent of 1,2-epoxy groups in the epoxy resin.

10. The composition of claim 9 wherein the source of said carboxyl groups is a mono-protic acid and said first-carboxyl-functional polymer is present in an amount sufficient to provide 1.5–2.5 equivalents of carboxyl groups per equivalent of 1,2-epoxy groups and said tertiary amine of (C) is present in the amount of 2.0–2.5 equivalents per equivalent of 1,2-epoxy groups.

11. The composition of claim 1 wherein said first carboxyl-functional polymer is present in an amount sufficient to provide no more than 6.0 equivalents of carboxyl groups per equivalent of 1,2-epoxy groups in the epoxy resin.

12. The composition of claim 1 wherein said epoxy resin has an epoxy equivalent weight of 1500–4000.

13. The composition of claim 1 wherein said first and second carboxyl-functional polymers are polymers of the same monomers or different monomers, including at least one $\alpha,\beta$-ethylenically unsaturated monomer and at least one $\alpha,\beta$-ethylenically unsaturated acid.

14. The composition of claim 13 wherein said $\alpha,\beta$-ethylenically unsaturated acid is represented by the structures:

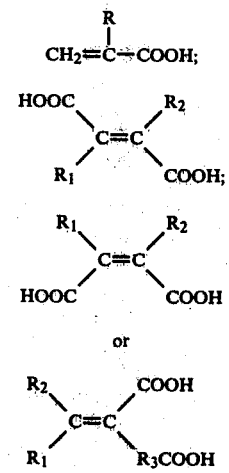

wherein R is hydrogen or an alkyl radical of 1–6 carbon atoms, $R_1$ and $R_2$ are hydrogen, an alkyl radical of 1–8 carbon atoms, halogen, cycloalkyl of 3–7 carbon atoms or phenyl, and $R_3$ is an alkylene radical of 1–6 carbon atoms; or half-esters thereof with alkanols of 1–8 carbon atoms.

15. The composition of claim 14 wherein said $\alpha,\beta$-ethylenically unsaturated acid is selected from the group consisting of acrylic cid, methacrylic acid, and itaconic acid.

16. The composition of claim 13 wherein said first carboxyl-functional polymer has an acid number of 150–350 and said second carboxyl-functional polymer has an acid number of 50–150.

17. The composition of claim 13 wherein said $\alpha,\beta$-ethylenically unsaturated monomer is at least one selected from the group consisting of

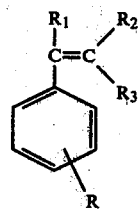

where R, $R_1$, $R_2$ and $R_3$ are hydrogen or an akyl radical of 1–5 carbon atoms;

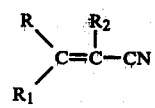

where R and $R_1$ are hydrogen, an alkyl radical of 1–18 carbon atoms, tolyl, benzyl or phenyl, and $R_2$ is hydrogen or methyl;

(c) esters of acrylic acid, methacrylic acid or mixtures thereof with alkanols of 1–16 carbon atoms;

(d) a mixture of up to 20% of said polymer, of hydroxyalkyl (meth)acrylate with at least one of (a), (b) and (c); and (e) a mixture of up to 20% of said polymer of (meth)acrylamide or N-alkoxymethyl (meth)acrylamide with at least one of (a), (b) and (c).

18. The composition of claim 17 wherein the $\alpha,\beta$-ethylenically unsaturated acid is selected from the group consisting of acrylic acid, methacrylic acid, and itaconic acid.

19. The composition of claim 2 wherein the tertiary amine of (C) $R_1R_2R_3N$ is selected from the group consisting of trimethyl amine, dimethyl ethanol amine, methyl diethanol amine, diethyl methyl amine, ethyl methyl ethanol amine, dimethyl benzyl amine, dimethyl propyl amine, dimethyl ethyl amine, dimethyl 3-hydroxy-1-propyl amine, dimethyl 2-hydroxy-1-propyl amine, dimethyl 1-hydroxy-2-propyl amine, and mixtures thereof.

20. The composition of claim 19 wherein the tertiary amine of (C) is dimethyl ethanol amine.

21. The composition of claim 1 consisting essentially of liquid carrier and the reaction product of:
(A) 65–90% by weight, based on the weight of (A) plus (B), of an epoxy resin containing, on the average, two terminal 1,2-epoxy groups per molecule and having an epoxy equivalent weight of about 1500–4000;
(B) a carboxyl-functional polymer in an amount sufficient to provide at least about 1.75 equivalents of carboxyl groups, when the source of the carboxyl group is a mono-protic acid, and at least 2.0 equivalents of carboxyl grups, when the source of such groups is a diprotic acid, per equivalent of 1,2-epoxy groups in the epoxy resin, said polymer having a weight average molecular weight (determined by light scattering) of about 10000–80000 and an acid number of about 150–350;
(C) an aqueous solution of at least about 1.75 equivalents of a tertiary amine per equivalent of 1,2-epoxy groups in the epoxy resin, said tertiary amine being selected from the group consisting of $R_1R_2R_3N$, pyridine, N-methylpyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms;
(D) optionally, 10–90% of the amount required for stiochiometric reaction with the carboxyl-functional polymer of (B) of at least one primary, secondary or tertiary amine or monofunctional quaternary ammonium hydroxide;
wherein for increasing ratios of carboxyl groups to 1,2-epoxy groups, the amount of amine is increased to keep the carboxyl-functional polymer water dispersible;
(E) said second carboxyl-functional polymer being blended in an amount of 5 to 200 parts by weight per 100 parts by weight of (A) plus (B) and having a weight average molecular weight (determined by light scattering) of about 10,000–160,000 and an acid number of 50–500, said acid number being at least 50 units different than the acid number of said first carboxyl-functional polymer, said second reaction product containing not less than 30% by weight of epoxy resin (A) based on the total of (A), (B), and (E).

22. The composition of claim 21 wherein components (A), (B), (C), (D) and (E) comprise about 0.1–50% by weight of the coating composition and the remainder is comprised of the liquid carrier which is water and, optionally, organic liquid in a volume ratio of from 70:30 to all water.

23. The composition of claim 22 wherein the liquid carrier is water and organic liquid in a volume ratio of about 80:20.

24. The composition of claim 1 or 21 additionally containing a crosslinking agent which is at least one of a phenol formaldehyde resin and a nitrogen resin.

25. The composition of claim 1 or 21 additionally containing diethoxytetramethoxymethylmelamine.

26. An article coated with a cured coating based on the composition of claim 1.

27. An article coated with a cured coating based on the composition of claim 1 additionally containing a nitrogen resin crosslinking agent.

28. A coating composition of claim 1 or 21 wherein components (A), (B), (C) and (E) are capable of forming a hydrogel structure.

29. A method of making the composition of claim 1 wherein
a first reaction mixture is made by dissolving the epoxy resin of (A) and the first carboxyl-functional polymer of (B) in an organic liquid,
then the tertiary amine of (C) is added to the first reaction mixture, to make a second solution,
then a third reaction mixture is made by adding a second carboxyl-functional polymer of (E) to said second reaction mixture,
then water is mixed with the third reaction mixture, if needed, to achieve a volume ratio of water to organic liquid between 70:30 and 90:10.

30. A method of making the composition of claim 1 wherein
a first reaction mixture is made by dissolving the epoxy resin of (A) and the first carboxyl-functional polymer of (B) in an organic liquid,
then the tertiary amine of (C) is added to the first reaction mixture to make a second solution,
then water is mixed with the second reaction mixture,
then a third reaction mixture is made by adding a second carboxyl-functional polymer of (E) to said second reaction mixture,
then water is mixed with the third reaction mixture, if needed, to achieve a volume ratio of water to organic liquid between 70:30 and 90:10.

31. A method of making the composition of claim 1 wherein
a first solution is made by dissolving the epoxy resin of (A) in an organic liquid,
then the tertiary amine of (C) is added to the first solution to form a polymeric quaternary ammonium hydroxide in an organic liquid,
then the carboxyl-functional polymer of (B), dissolved in an organic liquid, is mixed with the polymeric quaternary ammonium hydroxide with agitation to form a second solution,
then a third reaction mixture is made by adding a second carboxyl-functional polymer of (E) to said second reaction mixture, then water is mixed with the second solution, if needed, to achieve a weight ratio of water to organic liquid between 70:30 and 90:10.

32. A method of making the composition of claim 1 wherein a first solution is made by dissolving the epoxy resin of (A) in an organic liquid, then the tertiary amine of (C) is added to the first solution to form a polymeric quaternary ammonium hydroxide in an organic liquid, then the carboxyl-functional polymer of (B), dissolved in an organic liquid, is mixed with the polymeric quaternary ammonium hydroxide with agitation to form a second solution, then water is mixed with the second reaction mixture, then a third reaction mixture is made by adding a second carboxyl-functional polymer of (E) to said second reaction mixture, then water is mixed with the second solution, if needed, to achieve a weight ratio of water to organic liquid between 70:30 and 90:10.

33. The method of claim 31 wherein the carboxyl-functional polymer of (B) is pre-reacted to 10–90% of stoichiometry with at least one primary, secondary or tertiary amine or monofunctional quaternary ammonium hydroxide (D) before being mixed with the polymeric quaternary ammonium hydroxide.

34. The method of claim 32 wherein the carboxyl-functional polymer of (B) is pre-reacted to 10–90% of stoichiometry with at least one primary, secondary or tertiary amine or monofunctional quaternary ammonium hydroxide (D) before being mixed with the polymeric quaternary ammonium hydroxide.

35. A method of making the composition of claim 1 wherein a first solution is made by dissolving the carboxyl-functional polymer of (B) in an organic liquid, then an aqueous solution of a tertiary amine of (C) is mixed with the first solution to form a second solution, the the epoxy resin of (A) is mixed with the second solution to form a third solution, then a third reaction mixture is made by adding a second carboxyl-functional polymer of (E) to said second reaction mixture, then water is mixed with the third solution, if needed, to achieve a volume ratio of water to organic liquid between 70:30 and 90:10.

36. A method of making the composition of claim 1 wherein a first solution is made by dissolving the carboxyl-functional polymer of (B) in an organic liquid, then an aqueous solution of a tertiary amine of (C) is mixed with the first solution to form a second solution, then the epoxy resin of (A) is mixed with the second solution to form a third solution, then water is mixed with the second reaction mixture, then a third reaction mixture is made by adding a second carboxyl-functional polymer of (E) to said second reaction mixture, then water is mixed with the third solution, if needed, to achieve a volume ratio of water to organic liquid between 70:30 and 90:10.

37. The method of claim 29, 30, 31, 32, 33, 34, 35 or 36 wherein the resulting mixture of (A), (B) and (C) is heated between 50° and 95° C., to react (A), (B) and (C).

38. The method of claim 29, 30, 31, 32, 33, 34, 35 or 36 wherein the resulting mixture of (A), (B) and (C) is heated between 70° and 80° C., to react (A), (B) and (C).

39. The method of claim 20, 30, 31, 32, 35 or 36 wherein the mixed ingredients of said claim are allowed to react to produce a reaction product and then at least one primary, secondary or tertiary amine or monofunctional quaternary ammonium hydroxide of (D) is mixed with the reaction product.

* * * * *